Feb. 26, 1952      J. A. LOVE      2,587,494
DISK HARROW
Filed Aug. 20, 1948
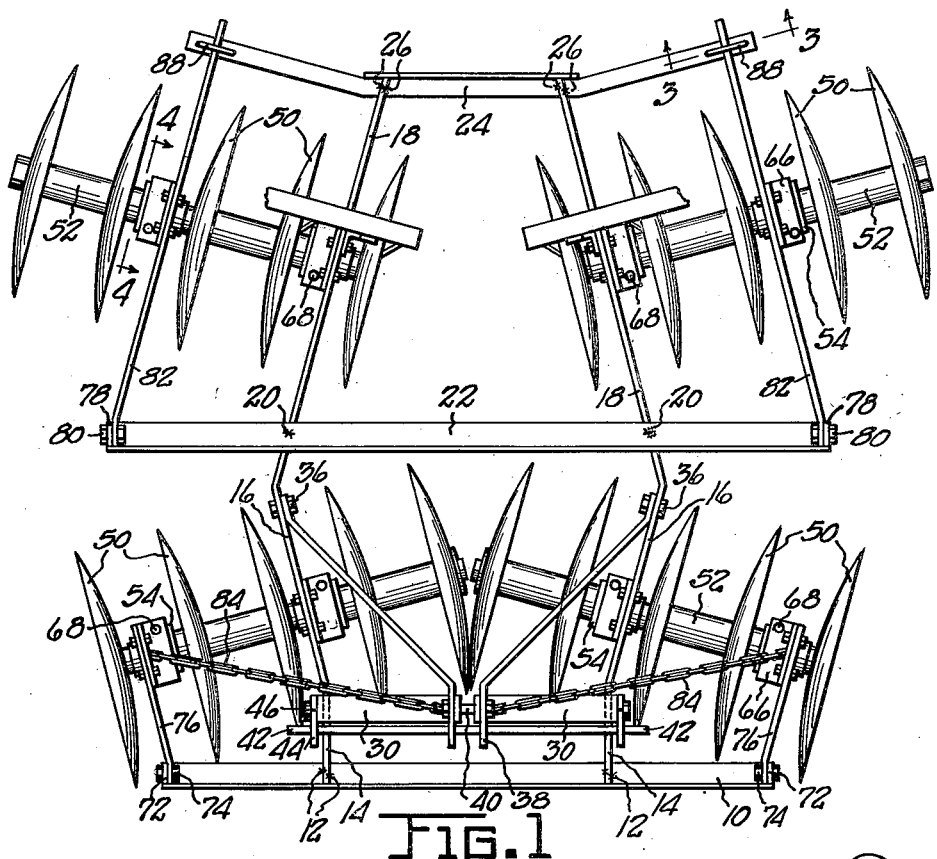
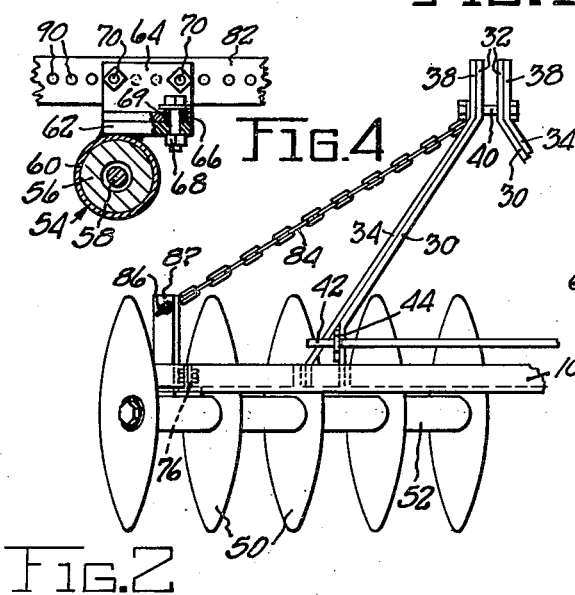
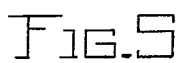
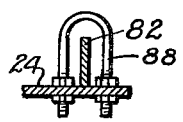
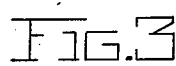
INVENTOR
JABEZ A. LOVE
BY
Oltsch & Knoblock
ATTORNEYS Patented Feb. 26, 1952

2,587,494

UNITED STATES PATENT OFFICE 2,587,494

DISK HARROW

Jabez A. Love, Silver Creek Township, Cass County, Mich.

Application August 20, 1948, Serial No. 45,402

12 Claims. (Cl. 55—73)

This invention relates to improvements in disk harrows, and more particularly to a disk harrow adapted for connection with a tractive vehicle having a power operated lift hitch.

The primary object of the invention is to provide a harrow which may be lifted bodily to an elevated position above the ground, whose disk blade gangs may be adjusted to different working positions or angles relative to the line of draft of the harrow, and whose disk blade gangs are so mounted and related to the frame of the implement as to permit them to tilt vertically relative to said frame in order to follow the contour of the ground engaged thereby.

A further object is to provide a novel, simple, inexpensive, compact and light weight lift type disk harrow.

A further object is to provide a disk harrow with a rigid frame to which one end portion of each of a plurality of disk blade gangs is connected, a plurality of members pivoted to said frame about transverse axes and each connected to the opposite end of a disk blade gang, and means carried by said rigid frame for limiting downward pivoting of each of said last named members and said gangs relative to said frame when the harrow is lifted bodily to an elevated position above ground level.

Other objects will be apparent from the following specification.

In the drawing:

Fig. 1 is a top plan view of the harrow.

Fig. 2 is a fragmentary front elevational view.

Fig. 3 is a detail sectional view taken on line 3—3 of Fig. 1;

Fig. 4 is a detail sectional view taken on line 4—4 of Fig. 1.

Fig. 5 is a view, partially in section, showing the flexible connection between the gang bearing and the frame member.

Referring to the drawing which illustrates the preferred embodiment of the invention, the numeral 10 designates a rigid frame member positioned transversely of the implement and preferably constituting an angle iron, a metal tube or any other suitable rigid structural element. In equally spaced relation to the opposite outer ends of the frame member 10 are connected at 12, preferably by welding, the front end portions 14 of a pair of elongated rigid members. The members 14 preferably constitute metal bars or plates whose major cross-sectional dimension is positioned vertically. The bars preferably diverge angularly outwardly at 16 in adjacent rearwardly spaced relation to the frame member 10 and thence terminate in rearwardly inwardly converging portions 18. At or adjacent to the junctions between the portions 16 and 18 of the longitudinally extending frame members is welded at 20, or otherwise suitably fixedly secured, a second rigid transverse frame member 22 whose opposite end portions project laterally from said longitudinal frame members and terminate in outwardly spaced relation thereto. A rigid crossbar 24 is welded or otherwise fixedly secured to the rear ends of the portions 18 of the longitudinal frame members at the points 26 as by means of welding. The rear cross-member 24 projects laterally outwardly beyond the longitudinal frame members 18 and, as here shown, is bent rearwardly from the center portion thereof.

The parts are so arranged that the longitudinal and transverse members are all fixedly secured together and constitute a unitary substantially rigid frame unit which may be suitably reinforced and cross-braced, as well understood in the art, if so desired.

A superstructure is preferably mounted upon the front end of the rigid frame and, as here shown, comprises a pair of rigid upwardly converging bars 30 which are secured at their lower ends to the front portions 14 of the longitudinal frame members. The upper ends of these superstructure members 30 preferably terminate in vertically projecting upper terminal portions 32. A second pair of upwardly converging frame members 34 are mounted upon the frame with their lower ends preferably secured to the portions 16 of the longitudinal frame members by securing members 36, such as bolts and nuts. The upper ends 38 of the members 34 bear in face engagement with the parts 32 and are connected thereto by a suitable cross-pin 40.

The rigid implement frame is adapted to be connected to a power actuated implement lift hitch mounted upon a tractor and of the type having three arms spaced laterally and transversely for connection with the frame of the implement. The connector pin 40 constitutes a connection point for one lift arm. Laterally spaced connectors 42 are suitably carried by the superstructure at opposite sides thereof and adjacent the lower end thereof for connection with the other two hitch arms of the lift hitch mechanism. These connector points may be secured to the frame of the implement in any suitable manner. Thus they may be fixedly secured to the frame. I prefer, however, to mount the same by means of rigid links 44 each pivoted at 46 at one end thereof to one of the superstructure members 30. The connectors 42, as here shown, form opposite ends of a bar extending across the front of the superstructure and carried by the free ends of said links 44.

A plurality of disk blade gangs, each comprising a plurality of disk blades 50 mounted in spaced concentric relation upon an axle or center shaft unit 52, are utilized in the harrow. These disk blade gangs are preferably of the construction illustrated in my co-pending application, Serial No. 768,168, filed August 12, 1947. Each of these disk blade gangs includes a pair of bearings 54 disposed in longitudinally spaced relation therealong and of any suitable construction. As here illustrated in Fig. 4 the bearings constitute tubular bearing members 56, preferably of oil impregnated wood, suitably positioned in concentric relation to a center shaft 58 passing through the unit and received in turn within a tubular outer bearing member 60. This tubular member has welded or otherwise suitably secured thereto a flat horizontal plate portion 62 which preferably projects laterally relative to the bearing sheath 60 at one end thereof. The inner bearing of each disk gang is connected to one of the longitudinal frame members and, as here illustrated, the front disk gangs are connected to the portion 16 of the longitudinal frame members between the transverse members 10 and 22, and the rear disk gangs are connected to the rear portion 18 of the longitudinal frame members between the transverse members 22 and 24. Any suitable bracket may be provided to connect the bearings of the disk gangs with the longitudinal frame members. Thus a bracket of the type illustrated in Fig. 4 may be utilized, the same constituting an angle iron having a vertical flange 64 and a horizontal flange 66. The horizontal flange 66 bears in face engagement upon the bearing plate 62 and is pivoted thereto at 68 by any suitable pivot means, such as a nut and bolt, and a spacer 69. The flange 66 has an aperture which receives the spacer 69 with clearance. The spacer 69 encircles the bolt shank, bears against the plate 62 at one end, and is of a length greater than the thickness of flange 66. This construction and arrangement permits pivoting of the parts about the bolt and spacer as a center and also permits relative tilting of the parts 62—66. The vertical web 64 of the bracket is secured to the longitudinal frame member as by bolts and nuts 70.

The opposite outer ends of the transverse member 10 are provided with rigid members 72 preferably extending vertically as shown in Fig. 1. To each of these members 72 is pivoted by any suitable means 74, such as a nut and bolt, a short rigid arm 76. The rear end of each of the arms 76 has connected thereto, as by means of brackets 64, 66, the outer bearing of the adjacent front disk gang. The outer ends of the transverse frame members 22 have transverse members 78 rigidly secured thereto, to which are pivoted at 80 the forward ends of elongated rigid bars 82. The bars 82 have connected thereto the outer bearings of the adjacent rear disk gangs by means of brackets 64, 66. The arms or links 76 preferably extend substantially parallel to the portions 16 of the rigid longitudinal frame members, and the arms 82 preferably extend substantially parallel to the rear portions 18 of the longitudinal frame members, as illustrated in Fig. 1.

Inasmuch as the outer ends of the front disk gangs are connected to the arms or links 76 which are free to swing vertically about the transverse axes of the respective pivots 74, and the spacers 69 permit relative tilting of the parts 62 and 66, the gangs are free to tilt vertically. This accommodates adjustment of each of said gangs to the contour of the ground engaged thereby so that each blade of each gang may do an effective and substantially equal ground-working or cutting operation in the normal use of the harrow. The same condition is accommodated with respect to the rear disk gangs by the connection of the outer ends thereof to the vertically swinging arms or links 82. Such adjustment of the disk gangs to follow the contour of the ground is desirable to insure uniform working of the ground across the entire width of the implement. It is necessary, however, that such vertical swinging movement be limited in order to permit the bodily lifting of the implement above ground level by a lift hitch. Suitable stop means are therefore utilized to limit the extent to which the free ends of the arms and links 76 and 82 may swing downwardly. As here illustrated, the free downward swinging of the links 76 and the connected outer ends of the front disk gangs is limited by an elongated flexible member 84, such as a chain as illustrated, a cable or any other suitable member. One end of each of the members 84 is connected to the superstructure adjacent the upper end thereof, and the opposite end of each member 84 is connected suitably to the free end of one of the arms or links 76. Thus, as illustrated in Fig. 2, the chain 84 is connected at its outer end at 86 to the upper end of an upright member 87. The length of the chain is so selected that when the free end of the arm 76 has swung downwardly relative to the plane of the rigid portion of the frame a predetermined extent, the chain will be drawn taut and further downward or pivotal movement of the arm and the disk gang will be prevented. A different type of stop limiting arrangement is illustrated in Fig. 1 with respect to the rear disk gangs. Thus the outer projecting portions of the rear transverse member 24 are downwardly off-set relative to frame members 18 and pass beneath the rear free ends of the arms 82 in a manner to support the same and the rear disk gangs when the implement is lifted bodily above ground level. Any suitable means for retaining the arms 82 in desired relation to the transverse members 24, allowing freedom of the arms 82 to swing within predetermined limits, may be employed. One such means is illustrated in Fig. 3 and constitutes U-bolts 88 each secured to the transverse frame member 24 adjacent an end thereof and extending over and around the free rear end portion of the adjacent arm 82.

It is desirable in a practical disk harrow to provide means for adjusting the angle at which the axis of each gang extends with respect to the line of draft of the harrow. Thus it is necessary in certain types of soil that the angle at which the gangs are set be less than the angle which is most effective in working other soils, such as soils of lighter and less dense consistency. Provision for such adjustment can be effected simply by providing for the mounting of one of the brackets 64, 66 associated with each disk gang at any of a number of selected longitudinal positions relative to the other bracket associated with the same disk gang. Thus the member, such as the arm 82, to which the bracket at the outer end of each rear disk gang is connected, has a plurality of apertures 90 spaced longitudinally therealong. It will be apparent that the securing members 70 for connecting the bracket flange 64 to the member 84 may pass through any selected ones of the spaced apertures 90 to position the same in any one of a plurality of positions each spaced a different distance from the transverse member 22. The angle assumed by the axis of each disk gang with respect to the longitudinal center line of the implement will thus depend upon the longitudinal position at which the bracket 64, 66 is secured. The change in angle is readily accommodated by the pivots 68 by means of which the bearing plates 62 of the disk gang are connected to the flanges 66 of the brackets. Change of the setting of the angle of any one disk blade will entail a slight change of the relationship of the associated arm 82 to the adjacent longitudinal frame portion 18. Such change of angle is readily accommodated, however, by providing play at the pivot 80 of said arm and by spacing the arms of the inverted U-bracket 88 to permit lateral displacement of the rear end of the associated arm 82. In the case of the front disk gangs, it is preferred that the portion 16 of the longitudinal frame be provided with a set of longitudinally spaced openings similar to the openings 90 of the arm 82 so that adjustment of the angle of the front disks is effected by altering the point of connection of the flange 64 of the bracket mounting the inner end of each disk gang. It will be apparent, however, that the points at which longitudinal adjustment may be made may be varied from that shown and described, as by providing for such longitudinal adjustment of the bracket 62, 64 at a different end of the associated disk gang than shown and described or by providing for such longitudinal adjustment at both ends of each disk gang.

It will be apparent from the foregoing description that when the disk harrow is connected with the arms of a lift hitch and is drawn along the ground, the blades will have any working attitude selected by the adjustment of said gangs by the positioning of the bracket 64, 66 so that an effective disking operation occurs. Furthermore, as mentioned above, if the ground being engaged by the disk blades is not level, the gangs can adjust themselves to the peculiarities or inclination of the ground contacted thereby and one or the other end tilted upwardly or downwardly to effect a uniform ground working action throughout the full length of each gang. When it is desired to lift the implement from the ground this can be accomplished by operating the lift harrow to an elevated position, whereupon all parts of the harrow are bodily raised and are maintained in controlled position with respect to each other. The outer ends of the gangs are held against excessive downward swinging by the chains 84 and the frame extensions 24, as mentioned above. It will be apparent further than the construction, which provides for this universal adaptability of the harrow to conditions encountered in use, is very simple and compact. A minimum number of parts is required and these parts may be constructed from units of standard shape, size and cross-sectional configuration. The unit is compact so as to reduce to a minimum, consistent with the necessary working spacing of the parts; the leverage exerted by the implement upon the lift hitch and the tractor mounting the same as said implement is raised and held above ground level.

While the harrow has been illustrated and described herein as adapted specifically for attachment to a lift hitch mechanism having three lift arms, it will be understood that it may be adapted readily for attachment to lift hitch mechanisms having only two arms or having more than three arms. In cases where the harrow is to be attached to a two-arm hitch, connection means for the hitch arms may be provided upon the main frame, as at longitudinally spaced points on each of the longitudinal members 14, 16, 18 of the rigid frame, thus eliminating necessity for the A-frame or superstructure. In cases where the lift hitch to which the harrow is to be attached has more than three hitch arms, the same number of connecting means must be provided on the harrow, and the frame and its superstructure must mount or position said means properly to correspond to the position and arrangement of the hitch arms, as will be apparent.

It will be understood that the construction herein shown and described is illustrative only and that changes may be made therein within the scope of the appended claims without departing from the spirit of the invention.

I claim:

1. A disk harrow, comprising a rigid frame including a main frame unit and a superstructure, a plurality of hitch connectors carried by said frame for attachment of a power operated lift hitch of the type having three arms spaced vertically and transversely, a plurality of disk blade gangs, means connecting the inner end of each gang to said main frame unit, rigid links pivoted to said main frame unit about transverse axes and projecting rearwardly from said axes, means connecting the outer end of each gang to a link, and stop means carried by said frame and cooperating with the free ends of said links for limiting downward pivoting of said links.

2. A disk harrow, comprising a rigid frame including a main frame unit and a superstructure, a plurality of hitch connectors carried by said frame for attachment of a power operated lift hitch of the type having three arms spaced vertically and transversely, a plurality of disk blade gangs, means connecting the inner end of each gang to said main frame unit, rigid links pivoted to said main frame unit about transverse axes and projecting rearwardly from said axes, means connecting the outer end of each gang to a link, and stop means carried by said frame and cooperating with the free ends of said links for limiting downward pivoting of said links, said stop means including an elongated flexible member connected at one end to the upper end of said superstructure and at its opposite end to one of said links spaced from the pivot connection of said link with said main frame unit.

3. A disk harrow, comprising a rigid frame including a main frame unit and a superstructure, a plurality of hitch connectors carried by said frame for attachment of a power operated lift hitch of the type having three arms spaced vertically and transversely, a plurality of disk blade gangs, means connecting the inner end of each gang to said main frame unit, rigid links pivoted to said main frame unit about transverse axes and projecting rearwardly from said axes, means connecting the outer end of each gang to a link, and stop means carried by said main frame unit and cooperating with the free ends of said links for limiting downward pivoting of said links, said stop means including a transversely projecting part of said main frame unit positioned below and engageable by one of said links.

4. A disk harrow, comprising a rigid frame including a main frame unit and a superstructure, a plurality of hitch connectors carried by said frame for attachment of a power operated lift hitch of the type having three arms spaced vertically and transversely, a plurality of disk blade gangs, means connecting the inner end of each gang to said main frame unit, rigid links pivoted to said main frame unit about transverse axes and projecting rearwardly from said axes, means connecting the outer end of each gang to a link, and stop means carried by said frame and cooperating with the free ends of said links for limiting downward pivoting of said links, said main frame unit including a longitudinally extending portion and laterally projecting portions, said gangs being connected to said longitudinal portion and said links being pivoted to said laterally projecting portions.

5. A disk harrow, comprising a rigid frame including a main frame unit and a superstructure, a plurality of hitch connectors carried by said frame for attachment of a power operated lift hitch of the type having three arms spaced vertically and transversely, a plurality of disk blade gangs, means connecting the inner end of each gang to said main frame unit, rigid links pivoted to said main frame unit about transverse axes and projecting rearwardly from said axes, means connecting the outer end of each gang to a link, and stop means carried by said frame and cooperating with the free ends of said links for limiting downward pivoting of said links, said connecting means each constituting a pair of members pivotally connected together on vertical axes and respectively connected to a disk gang and to said frame, at least one connecting means associated with each gang being longitudinally adjustable relative to said frame.

6. In a disk harrow, a rigid frame including a sub-frame and a superstructure, connectors carried by said frame adapted for connection with lift arms of a power actuated lift hitch, said sub-frame including fixedly interconnected longitudinal and transverse frame members, at least one transverse frame member projecting laterally outwardly at its ends relative to said longitudinal members, a pair of rigid links pivoted to the ends of said transverse member for vertical swinging movement, a pair of disk gangs, means connecting the inner ends of said disk gangs to said longitudinal frame members and the opposite ends of said disk gangs to the ends of said links, and stop means carried by said frame for limiting downward swinging of the free ends of said links relative to the level of their pivot axes.

7. In a disk harrow, a rigid frame including a sub-frame and a superstructure, connectors carried by said frame adapted for connection with lift arms of a power actuated lift hitch, said sub-frame comprising rigidly connected longitudinal and transverse members, a pair of rearwardly projecting links pivoted to a transverse member spaced from said longitudinal members, a pair of disk blade gangs, means connecting one end of each gang with a longitudinal frame member and the other end of each gang with a link, means for adjusting the longitudinal position of one connecting means relative to the other, and a pair of elongated flexible members each connected at one end to said super-structure and at its other end to the free end of a link.

8. In a disk harrow, a rigid frame including a sub-frame and a superstructure, connectors carried by said frame adapted for connection with lift arms of a power actuated lift hitch, said sub-frame comprising rigidly connected longitudinal and transverse members, a pair of rearwardly projecting links pivoted to a transverse member spaced from said longitudinal members, a pair of disk blade gangs, means connecting one end of each gang with a longitudinal frame member and the other end of each gang with a link, means for adjusting the longitudinal position of one connecting means relative to the other, the rear ends of said links overlying a transverse frame member to be supported thereby when said harrow is lifted above the ground by said lift hitch.

9. In a disk harrow, a rigid frame including a sub-frame and a superstructure, connectors carried by said frame adapted for connection with lift arms of a power actuated lift hitch, a plurality of disk blade gangs, means connecting each gang adjacent one end thereof to said sub-frame in rearwardly spaced relation to the front of said sub-frame, a draft member connected to the sub-frame forwardly of each disk gang and connected to the adjacent gang spaced from the connection of said gang with said sub-frame, said draft member accommodating tilting of said gang relative to its connection with said sub-frame, and stop means carried by said frame for limiting downward tilting of the end portions of the disk gangs which are connected to said draft members.

10. In a disk harrow, a rigid frame including a sub-frame and a superstructure, connectors carried by said frame adapted for connection with lift arms of a power actuated lift hitch, a plurality of disk blade gangs, means connecting each gang adjacent one end thereof to said sub-frame in rearwardly spaced relation to the front of said sub-frame, a draft member connected to the sub-frame forwardly of each disk gang and connected to the adjacent gang spaced from the connection of said gang with said sub-frame, said draft member accommodating tilting of said gang relative to its connection with said sub-frame, and stop means carried by said frame for limiting downward tilting of the end portions of the disk gangs which are connected to said draft members, one of the connections of each disk gang being shiftable lengthwise of the frame whereby the working angles of said gangs relative to the line of draft may be varied as desired.

11. A disk harrow adapted to be connected to a lift hitch mounted upon a tractive vehicle and including a plurality of hitch arms, comprising a rigid frame including a longitudinal portion and longitudinally spaced transverse rigid members, a plurality of spaced connecting means carried by said frame and adapted for connection to said hitch arms, a plurality of disk gangs arranged in tandem, means connecting each gang adjacent one end thereof to said longitudinal frame portion, draft members connected to said transverse frame members for vertical swinging movement, means connecting the other end of each gang to the adjacent draft member, said connecting means and draft means accommodating vertical tilting of said gangs, and stop means carried by said frame for limiting downward tilting of the ends of said gangs which are connected to said draft members.

12. A disk harrow adapted to be connected to a lift hitch mounted upon a tractive vehicle and including a plurality of hitch arms, comprising a rigid frame including a longitudinal portion and a front rigid transverse member, a plurality of spaced connecting means carried by said frame and adapted for connection to said hitch arms, a plurailty of disk gangs, means for connecting each gang to said frame rearwardly of said front member, draft members connected to said front frame member for vertical swinging movement, means connecting each gang to a draft member, said connecting means being spaced apart longitudinally of said gangs and accommodating vertical tilting of said gangs as said draft members swing, and stop means carried by said frame for limiting downward swinging of the portion of each gang which is connected to a draft member.

JABEZ A. LOVE.

REFERENCES CITED

The following references are of record in the file of this patent:

UNITED STATES PATENTS

| Number | Name | Date |
| --- | --- | --- |
| Re. 8,147 | Bayliss | Apr. 2, 1878 |
| 301,729 | La Dow | July 8, 1884 |
| 2,394,210 | Sherman | Feb. 5, 1946 |
| 2,398,147 | McKay | Apr. 9, 1946 |